United States Patent
Esch et al.

(10) Patent No.: US 7,651,325 B1
(45) Date of Patent: Jan. 26, 2010

(54) VACUUM CLEANER FAN

(75) Inventors: Guenter Esch, Schleiden (DE); Peter Rode, Euskirchen (DE); Hans-Joachim Hegemann, Alfter (DE)

(73) Assignee: Miele & Cie. KG, Guetersloh (DE)

( * ) Notice: Subject to any disclaimer, the term of this patent is extended or adjusted under 35 U.S.C. 154(b) by 0 days.

(21) Appl. No.: 09/582,307

(22) PCT Filed: Oct. 27, 1999

(86) PCT No.: PCT/EP99/08099

§ 371 (c)(1),
(2), (4) Date: Jun. 22, 2000

(87) PCT Pub. No.: WO00/25656

PCT Pub. Date: May 11, 2000

(30) Foreign Application Priority Data

Oct. 31, 1998 (DE) ................................. 198 50 236

(51) Int. Cl.
F04B 17/03 (2006.01)
H02K 5/04 (2006.01)
H01R 39/38 (2006.01)

(52) U.S. Cl. ............ 417/423.2; 417/423.7; 417/423.14; 310/239; 310/62; 310/89

(58) Field of Classification Search ................. 417/360, 417/366, 423.2, 423.14, 423.7; 310/239, 310/242, 253, 62, 89
See application file for complete search history.

(56) References Cited

U.S. PATENT DOCUMENTS 1,995,630 A * 3/1935 Bass ............................ 15/391

3,592,566 A * 7/1971 Beardslee ................ 417/423.2

(Continued)

FOREIGN PATENT DOCUMENTS

DE 1563028 4/1970

(Continued)

*Primary Examiner*—Charles G Freay
(74) *Attorney, Agent, or Firm*—Darby & Darby

(57) ABSTRACT

In a vacuum cleaner blower (1) consisting of an electric drive motor (2) and a support cage (10) for receiving the structural modules of the drive motor such as stator pack (6), rotor (7) and brush holders (8) including carbon brushes (9) as well as an at least single stage blower unit driven by the motor including a deflector (11), impeller (12) and suction hood (4), the deflector being formed as a support cage lid including a bearing seat for the rotor (7) and the support cage (10) being formed for a mounting direction (C) of its structural modules in the axial direction of the blower and for direct contacting and the brush holder (8) of the carbon brushes being provided adjacent to the upper side (B) of the support cage which also faces the deflector (11). Because of this specialty, all structural modules essential for the electric motor aggregate such as stator pack, rotor, rotor bearing as well as brush holder including carbon brushes may for the completion of the suction blower be successively and fully automatically be inserted and secured in their proper disposition into the support cage (10), without additional fastening elements, in a preferred assembly and mounting direction (C). During mounting direct contacting of the electrical connectors of the stator (6) and carbon brushes (9) or brush holders (8) takes place as well without changing the assembly direction.

27 Claims, 6 Drawing Sheets

U.S. PATENT DOCUMENTS

| | | | |
|---|---|---|---|
| 4,057,370 A * | 11/1977 | Numata et al. | 417/366 |
| 5,477,588 A | 12/1995 | Iida et al. | |
| 5,811,899 A * | 9/1998 | Warner et al. | 417/423.2 |
| 6,036,455 A * | 3/2000 | Ciccarelli | 417/423.14 |
| 6,100,617 A * | 8/2000 | Carter et al. | 310/90 |
| 6,220,827 B1 * | 4/2001 | Steffes et al. | 417/360 |
| 6,232,696 B1 * | 5/2001 | Kim et al. | 417/423.7 |

FOREIGN PATENT DOCUMENTS

| | | |
|---|---|---|
| DE | 19606146 | 8/1997 |
| EP | 0270935 | 6/1988 |

* cited by examiner

VACUUM CLEANER FAN

CROSS REFERENCE TO RELATED APPLICATIONS

This is a U.S. national phase application under 35 U.S.C. §371 of International Patent Application No. PCT/EP99/08099, filed Oct. 27, 1999, and claims benefit of German Patent Application No. 198 50 236.2, filed Oct. 31, 1998.

BACKGROUND OF THE INVENTION

1. Field of the Invention

The subject of the invention relates to a blower for a vacuum cleaner consisting of an electric drive motor and a support cage for receiving structural modules of the drive motor, such as stator pack, rotor and brush holder with carbon brushes as well as an at least single stage blower unit driven by the motor and having a deflector, an impeller and suction hood, the deflector being at the same time structured as a lid for the support cage and providing a bearing seat for the rotor.

2. The State of the Prior Art

A vacuum cleaner blower of this type is known, for instance, from German patent specification DE-AS 15 63 028.

The prior art device is provided with a support cage made of an insulating material for receiving structural electrical modules of the motor, such as stator pack, rotor and brush holder for carbon brushes, and, at its bottom, with a bearing seat for the bearing of one of the two rotor bearings. Laterally of the rotor bearing the support cage is provided with two brush holders for the collector carbon brushes. In the wall of the housing or cage there are also provided recesses for directly receiving electrical connectors. The open side of the support cage facing the blower is structured as a centering rim for a deflector enclosing the support cage and supporting a second rotor bearing. In this support cage, the brush holders provided in the lower section of the housing and the plastic support cage form an integral unit. However, the carbon brushes of the rotor aligned transversely of the vertical axis of the support cage have to connected, as well as inserted, from the outside. Accordingly, the assembly of the known suction blower suffers from the drawback that during assembly of the suction blower the insertion and connecting devices have to be changed several times. Accordingly, it is not possible to realize a cost-efficient and fully automatic simple fabrication and blower assembly process. Thus, in the prior art the necessary securing of the stator pack by means of screws inserted through the support cage wall necessitates a change in direction during assembly such that the required assembly tool has to be withdrawn to the outside before the rotor can thereafter be inserted into the support cage in the preferred assembly orientation and direction of mounting. The same drawback exists in connection with the assembly and connection of the carbon brushes.

OBJECT OF THE INVENTION

It is an object of the invention to structure a support cage so as to enable a simple cost-efficient assembly of the various structural modules of the suction blower without changes in the mounting direction and automatic contacting of the electrical connections of the motor, such as carbon brushes, winding connectors, etc., during assembly of the structural modules in the support cage.

SUMMARY OF THE INVENTION

The object is accomplished by the characteristics defined in patent claim 1. Advantageous embodiments and improvements of the invention are set forth in the ensuing sub-claims.

The essential advantage obtained by the invention is that for finalizing the suction blower in a preferred assembly and mounting direction, all essential structural modules required for the operation of the electric motor aggregate, such as stator assembly, rotor, rotor bearing as well as brush holder with carbon brushes, may be automatically and successively inserted from the upper side of the support cage, and secured in their proper orientation, within the support cage, without additional fasteners. During assembly, without changing the assembly direction, the electrical connections of the stator and the rotating rotor are contacted directly by way of the carbon brushes. The inventive structure of the support cage for arranging and accommodating the brush holders of the carbon brushes near the upper side of the cage facing the deflector as well as the special configuration of the support cage for the stator with connectors and the electrical contacts facilitate the advantageous simple assembly of the suction blower. Moreover, as distinguished from the prior art, it is also possible to arrange electrical components necessary for protecting the windings and/or motor in the support cage. The motor may also be equipped with electronic components in the preferred assembly and mounting direction, simply and automatically.

DESCRIPTION OF THE SEVERAL DRAWINGS

An embodiment of the invention is schematically depicted in the and will be described in greater detail hereinafter. In the drawings.

DESCRIPTION OF EMBODIMENT

Figure 1:
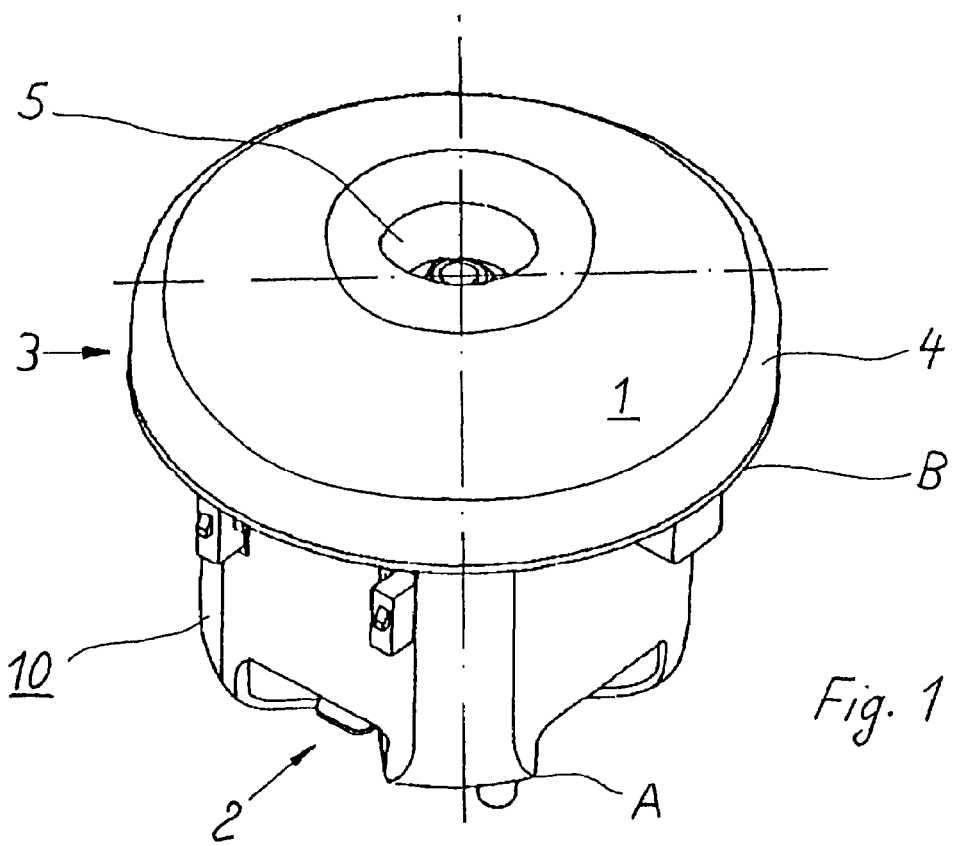
FIG. 1 is a perspective view of a suction blower for a vacuum cleaner.
Figure 2:
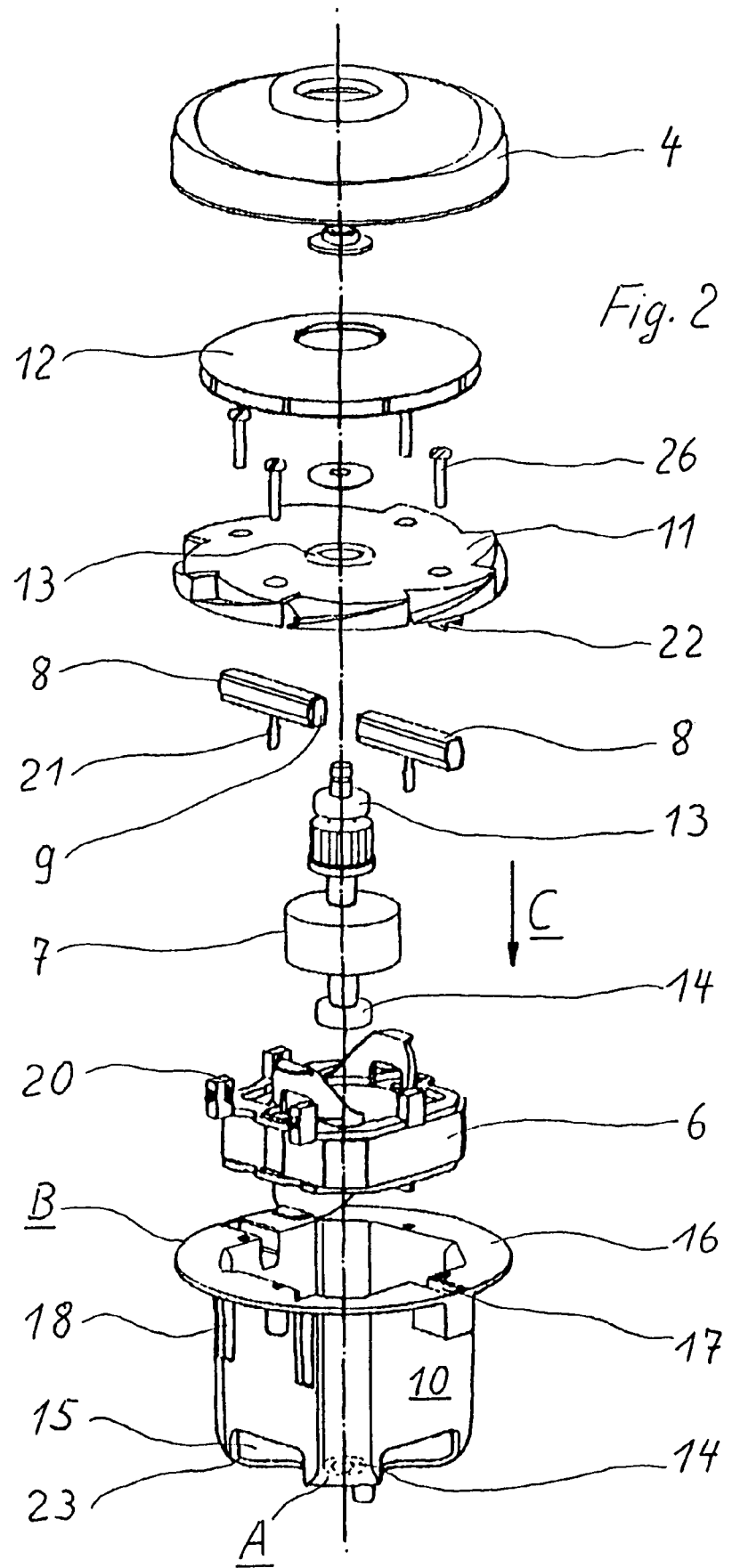
FIG. 2 is an exploded view of the structural modules of the suction blower in the sequence of their assembly.

In FIG. 1, 1 denotes a suction blower for a vacuum cleaner (not shown), the aggregate consisting of an electric drive motor 2 and a blower unit 3 driven by the motor. The blower unit 3 is covered by a suction hood 4 provided with a suction opening 5 for the flow of suction air. The sucked in air permeated the drive motor 2 and exits at the rear of the motor from a support cage 10. As shown in FIG. 2, the support cage 10 receives the known structural modules of the drive motor 2, such a wound stator assembly 6, a rotor 7 and brush holders 8 with carbon brushes 9. The blower unit 3 is of the single stage type and consists of a deflector 11 provided below the suction hood 4, and an impeller 12. The deflector 11 also serves as a cover for the drive motor 2 in the support cage and is provided with a bearing or bearing seat 13 (side B of the support cage) for the rotor 7. The other bearing seat 14 for the rotor 7 is provided in the bottom 15 of the support cage 10 (see FIGS. 1, 2, 5) defined as side A of the support cage. In the embodiment shown, the bearing seat 14 is arranged in a cruciform bracket 23 formed in the bottom 15 of the support cage for realizing the exits for the suction air flowing through the motor. Of course, the cruciform structure of the bracket is not mandatory. Any other structure may be provided as suction air exits, such as an enclosed cage bottom provided with laterally formed air slots.

FIG. 2 is an exploded view of the structural modules of the suction blower 1 in the sequence of their assembly. To this end, the support cage 10 is structured, in accordance with the invention, for a mounting direction (arrow C) of its structural modules in the axial direction of the aggregate, as well as for direct contacting. To this end, the brush holders 8 of the carbon brushes 9 are provided adjacent to the upper side B of the support cage which faces the deflector 11.

At its side facing the deflector 11 the support cage 10 is formed to have an outwardly flared rim. The flared rim 16 is provided with receptacles 17 which are open in an upward direction and in the direction of the support cage 10 (see FIGS. 2 to 5), into which the brush holder 8 of the carbon brushes 9 may be placed from above. Furthermore, opening 18 are provided in the rim 16 (FIGS. 2 to 4) and extending into the wall 19 of the support cage 10. This structure allows insertion from above into the support cage 10 of the stator assembly 6 as well with its connections 20 extending beyond the support cage wall 19 and in contact with the control electronics (not shown) of the motor. Insertion of the brush holder 8, by direct contact of the brush holder contact pins 21 (FIG. 4) with the stator contacts 20, provides an electric connection between the rotor 7 and the stator.

Following assembly of the structural components of the drive motor, the support cage 10 is closed and centered by, and screwed to, the deflector 11 serving also as a lid or bearing shield for the second rotor bearing. For aligning the support cage 10 and the deflector 11 relative to each other one or more centering guides 22 which positively engage each other, are respectively formed in the flared rim 16 of the support cage 10 and in the marginal area of the underside of the deflector 11. The centering guides 22 may be pins, profiled protrusions, bores or the like.

Figure 5:
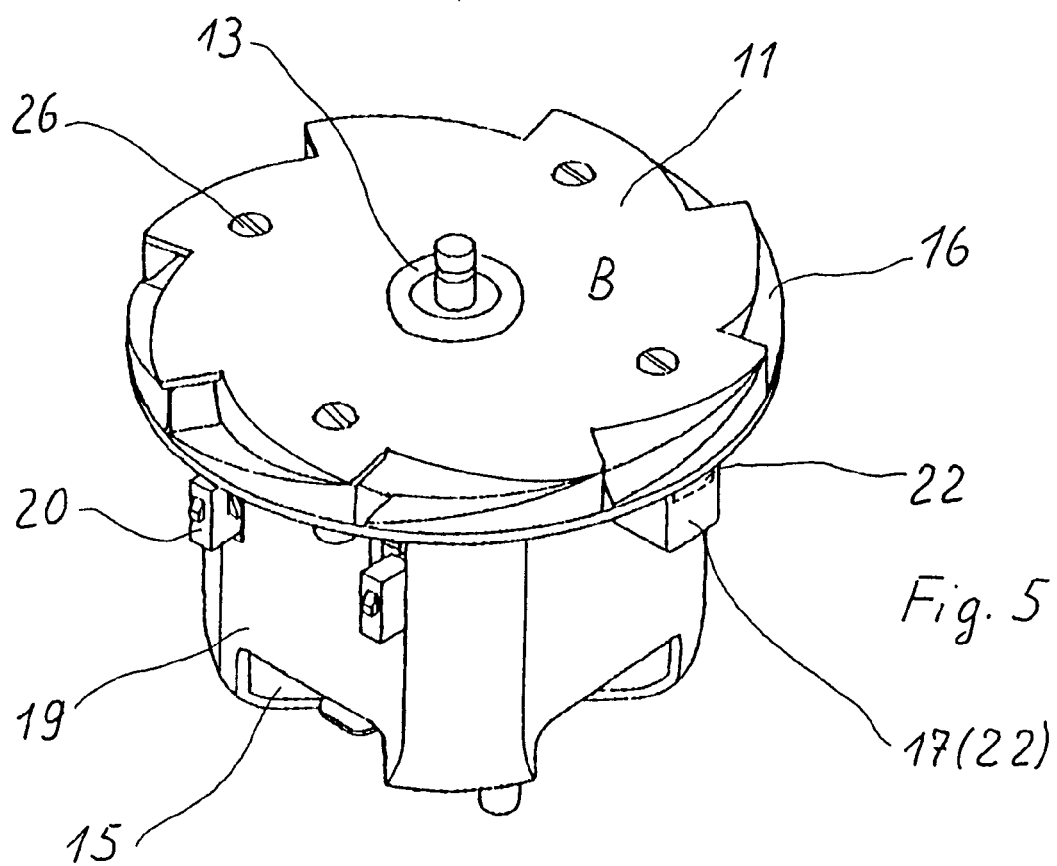
FIG. 5 is a perspective view of the support cage with the deflector of the blower unit mounted therein.
Figure 6:
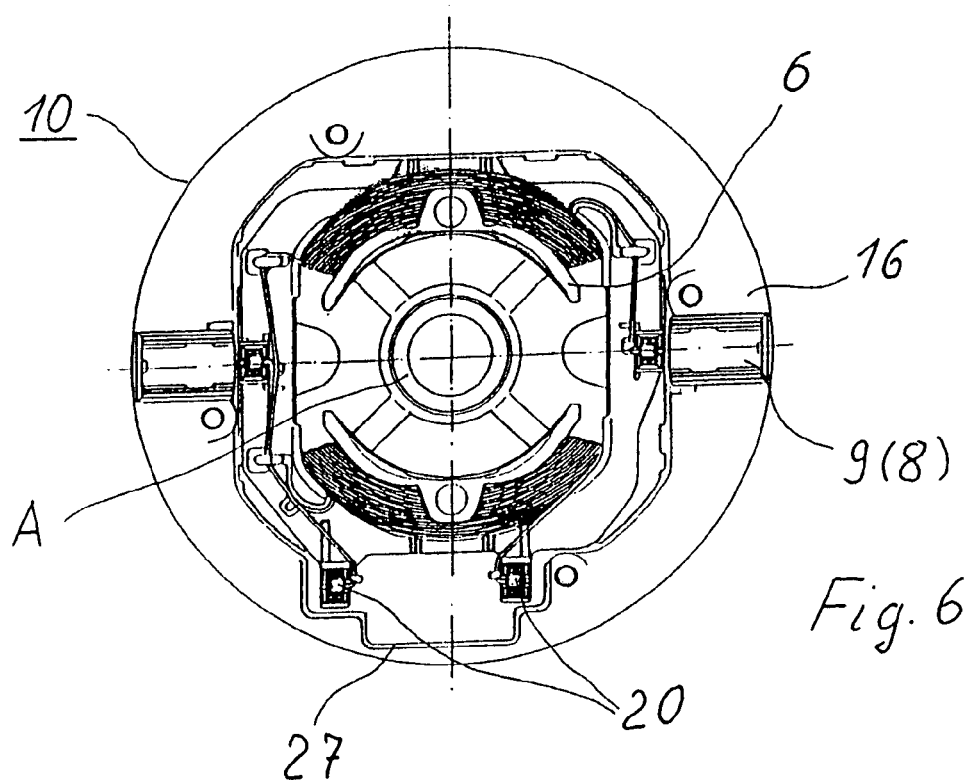
FIG. 6 is a top elevation of the support cage with a separate receptacle on the support cage for an adaptor housing for receiving a circuit board including electrical components for the drive motor of the suction blower.
Figure 7:
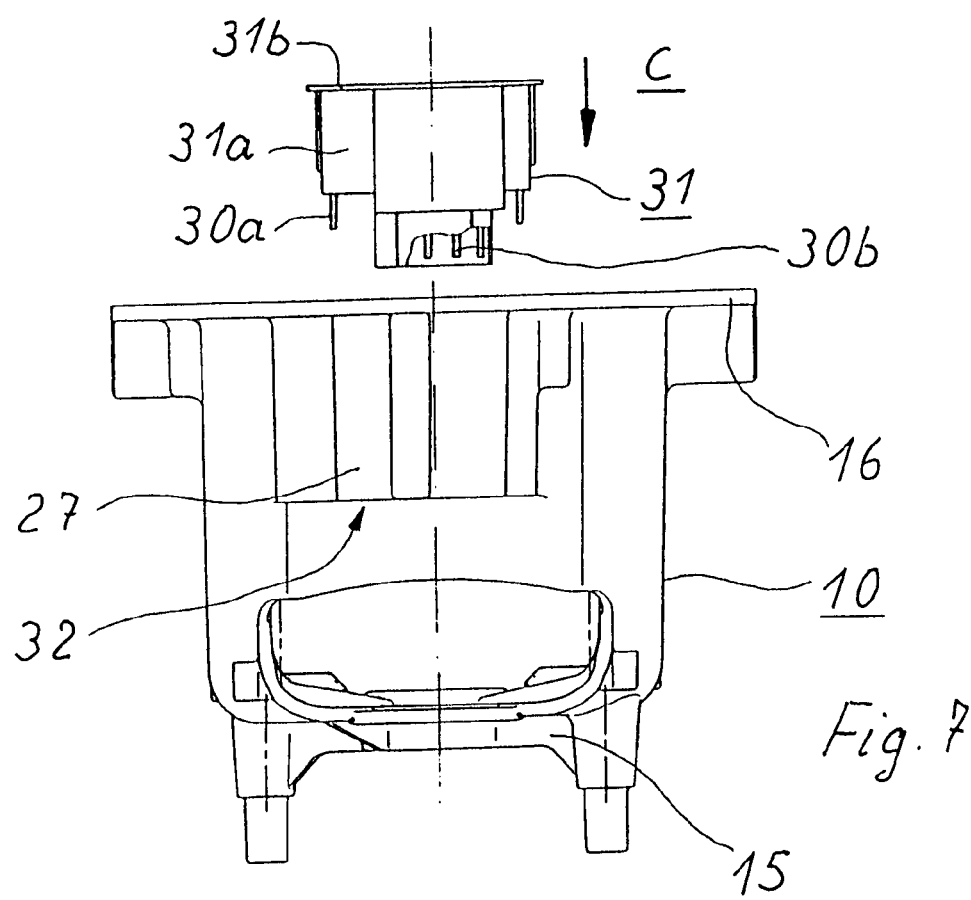
FIG. 7 is a front elevation of the support cage including the adaptor housing and circuit board arranged, in the assembly direction, above the receptacle.

It is of particular advantage to form the centering guides 22 with a profile, for instance a U-shaped profile, as shown in FIGS. 2 and 5, which fits precisely into the receptacles 17 of the brush holders 8 in the support cage 10. On the one hand, this causes the deflector 11 to be precisely centered during assembly of he suction blower 1 and, on the other hand, the brush holders 8 and carbon brushes 9 a securely set to allow for an optimum direct contact. Such centering guides 22 additionally serving as hold downs for the carbon brushes 9 eliminate the need for screwed connections and simplify the assembly operation.

Figure 3:
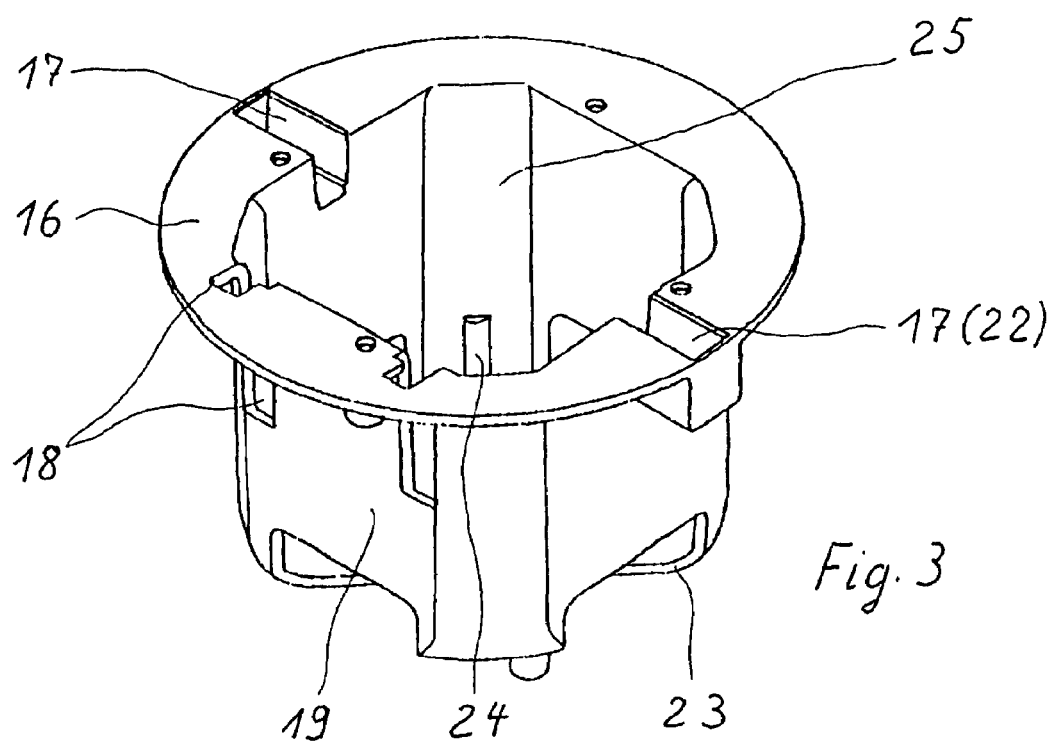
FIG. 3 is a perspective view of a support cage of the suction blower.
Figure 4:
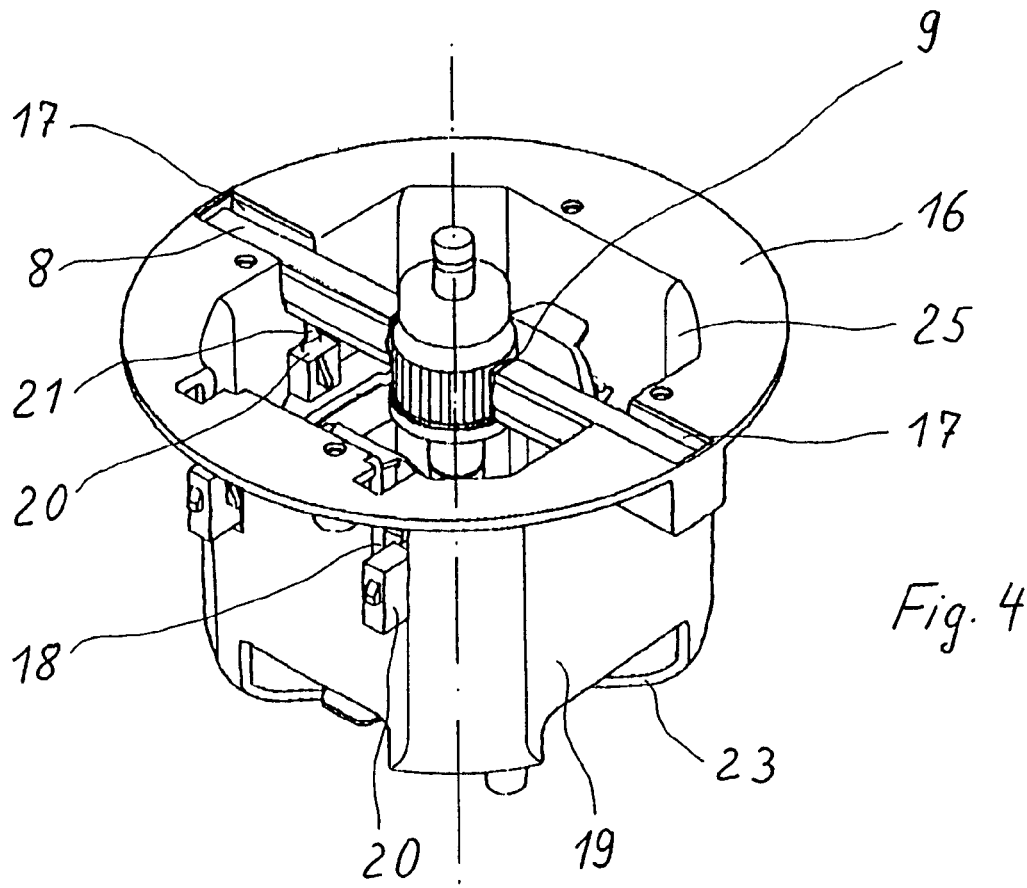
FIG. 4 is a perspective view of the support cage with the stator assembly, rotor and brush holder with carbon brushes mounted therein.

As shown in FIGS. 3 and 4, support braces 24 or receptacles 25 complementing the contour of the stator assembly 6 are integrally formed in the support cage 10 for securely receiving and supporting the stator. The cruciform bracket 23 at the bottom 15 of the support cage formed by the air vents in the wall 19 of the support cage is provided with the second rotor bearing 14. The support cage 10 and the deflector 11 as supports for the rotor bearings are made of a non-conductive material, in particular a plastic. The insulating plastic allows mounting of the electrically conductive brush holders 8 without additional measures of insulation.

As shown in FIG. 2 assembly of the suction blower 1 is carried out from above in the preferred direction C of mounting. As it requires no change in direction, the assembly may be carried out fully automatically. The arrow marks the direction in which the individual structural modules of the blower are successively put together in individual assembly steps. Initially, a ball bearing balancing disk (not shown) is assembled into the bearing seat 14 in the bottom 15 of the support cage 10. Thereafter, the stator assembly 6 is inserted into the cage, and it is centered and secured therein by the support abutments (FIG. 3) as well as by the interior shape of the support cage 10 conforming in its contour to the stator assembly 6. After insertion of the wound stator assembly 6, the rotor is inserted followed by the mounting of the brush holders 8 and its carbon brushes 9. During their placement, the carbon brushes 8 insulated in their receptacles 17 of the plastic support cage 10 directly contact the connectors 20 of the stator pack by way of their brush holder connector contacts 21. Accordingly, the electrical connection between the rotor 7 and the stator is established as soon as the brush holder 8 are inserted. Thereafter, the deflector 11 is mounted as the closing element of the support cage 10 and is secured to the support cage 10 be a screw connection 28. The deflector 11 is affixed to the flared rim 16 in a centered orientation. This connection causes the structural modules of the drive motor 2 to be centered automatically and secured within the cage ensuring, at the same time, the direct contact. During its assembly, the deflector 11 and its integrated bearing seat 13 receives the second rotor bearing. Thereafter, mounting takes place of the impeller 12 and of the suction hood 4 which, secured to the support cage 10 encloses the blower unit 3 toward the exterior. Even during this assembly operation, the direction C of mounting, FIG. 2, in the axial direction of the suction blower 1 can be maintained.

Figure 10:
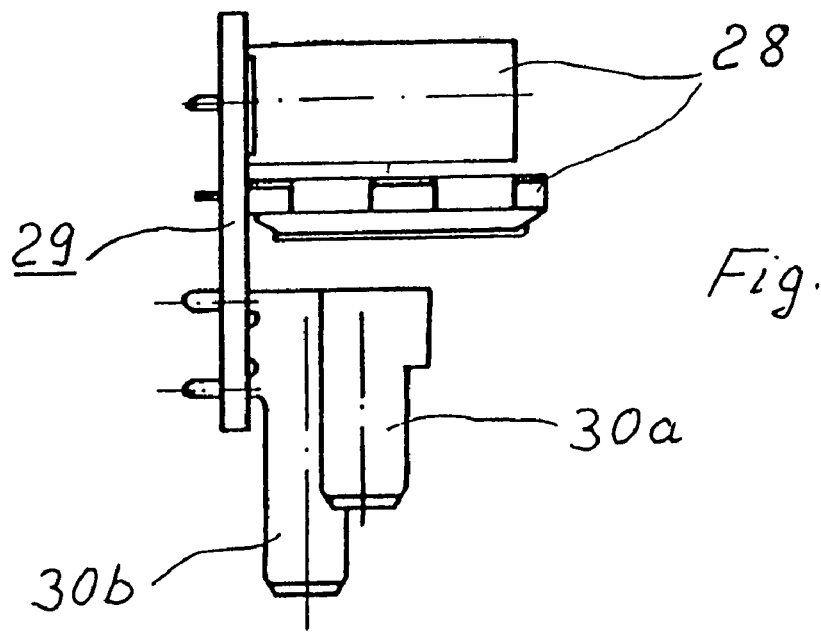
FIG. 10 is a side elevation of a circuit board equipped with electrical components, for the adaptor housing.

Electric components for switching, control and/or safety features needed for the suction blower drive motor 2 may be advantageously arranged within the support cage 10 as a result of the special structure of the support cage 10. At least one further receptacle 27 (see FIGS. 6 to 9) is provided in the flared rim 16 of the support cage 10 for receiving electric components 28. The electric components are arrange on a circuit board 29 or platen which preferably also supports the connection pins 30a, 30b for direct connections (see FIG. 10).

During assembly, the circuit board 29 is inserted separately into the receptacle 27 or, as provided in the embodiment, such a circuit board 29 is inserted into a separate adaptor housing 31 (see FIGS. 7, 8, 11) which is then inserted into the receptacle 27. At its bottom, the receptacle 27 formed in the wall of the support cage (FIG. 9) is provided with a socket 32 for an external connection to a net. The socket opening 32 extends the wall 19 of the support cage 10 in an axial direction.

The adaptor housing and complementing circuit board 29, or the circuit board as such, is provided with the mentioned connector pins 30a, 30b which, for establishing a direct contact, are disposed in an axial direction of the support cage 10. The connector pins 30a, 30b are preferably mounted on the circuit board 29. Following assembly of the blower, the connector pins 30b are needed for a connection with the external net socket connection.

When mounting the adaptor (mounting direction C) first contact pins 30a of the adaptor housing 31 or of the circuit board 29 will connect to associated contacts 20 of the stator pack. The remaining connector pins 30b for external net connection extend freely into the socket opening 32. Preferably, mounting of the adaptor housing 31 and associated circuit board 29 preferably takes place after insertion of the stator 6 into the support cage 10.

The adaptor housing 31 and the electric components 28 on the circuit board 29 may be fitted positively into the receptacle 27. In the simplest case, the electrical components 28 on the circuit board 29 include a decoupling capacitor for the suction blower drive motor 2 as well as a thermal switch for the protection of the windings and/or motor. It is also possible optionally to provide electric power switches, or to arrange them in an addition receptacle.

Figure 8:
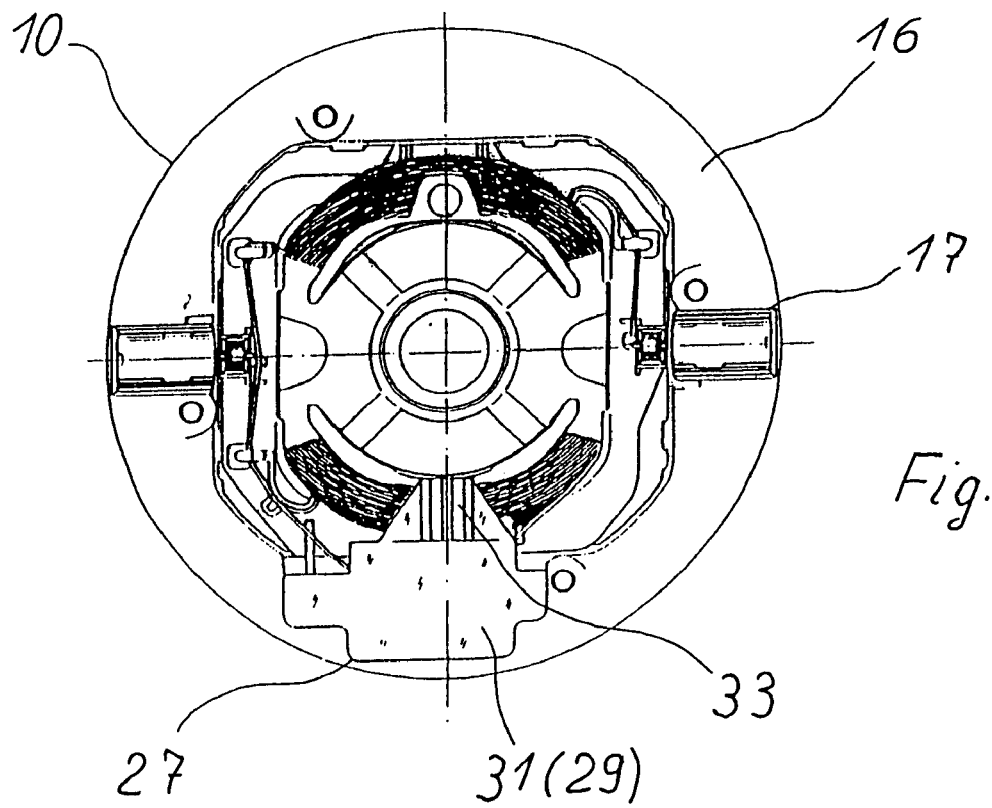
FIG. 8 is a top elevation of the support cage corresponding to FIG. 6 with the inserted adaptor housing.
Figure 9:
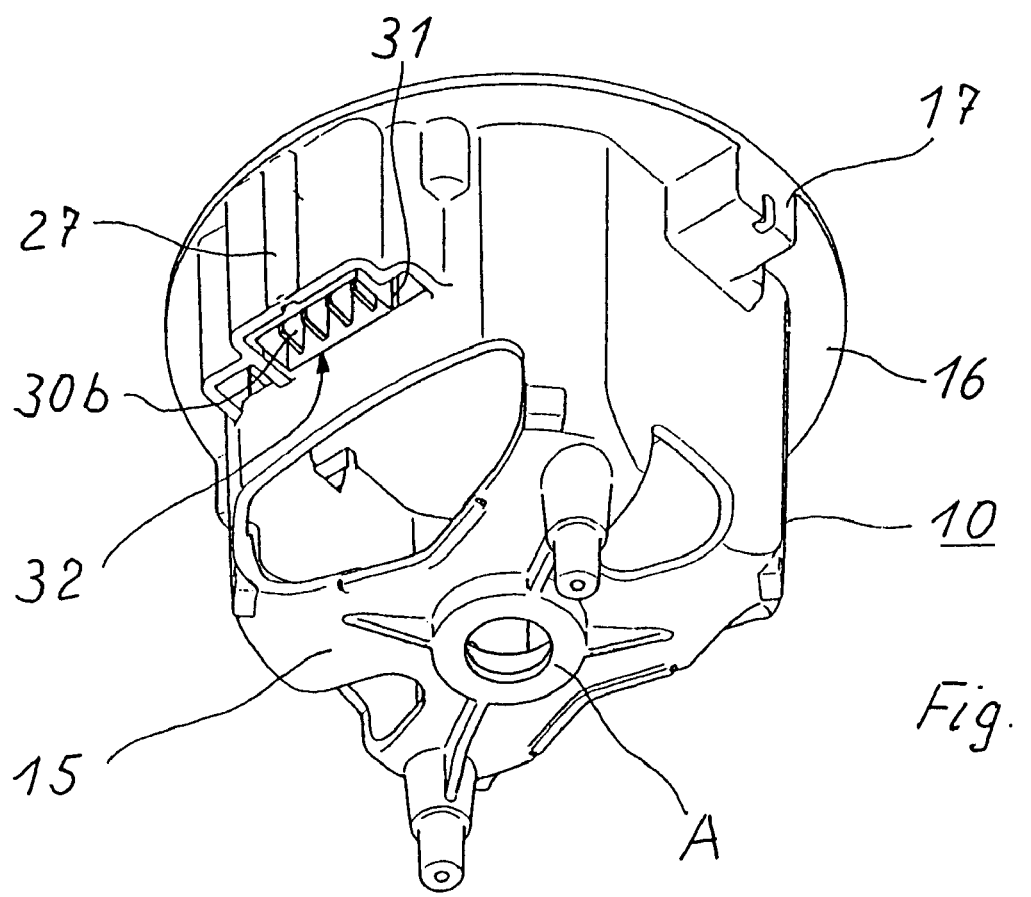
FIG. 9 is a perspective view from below of the support cage.
Figure 11:
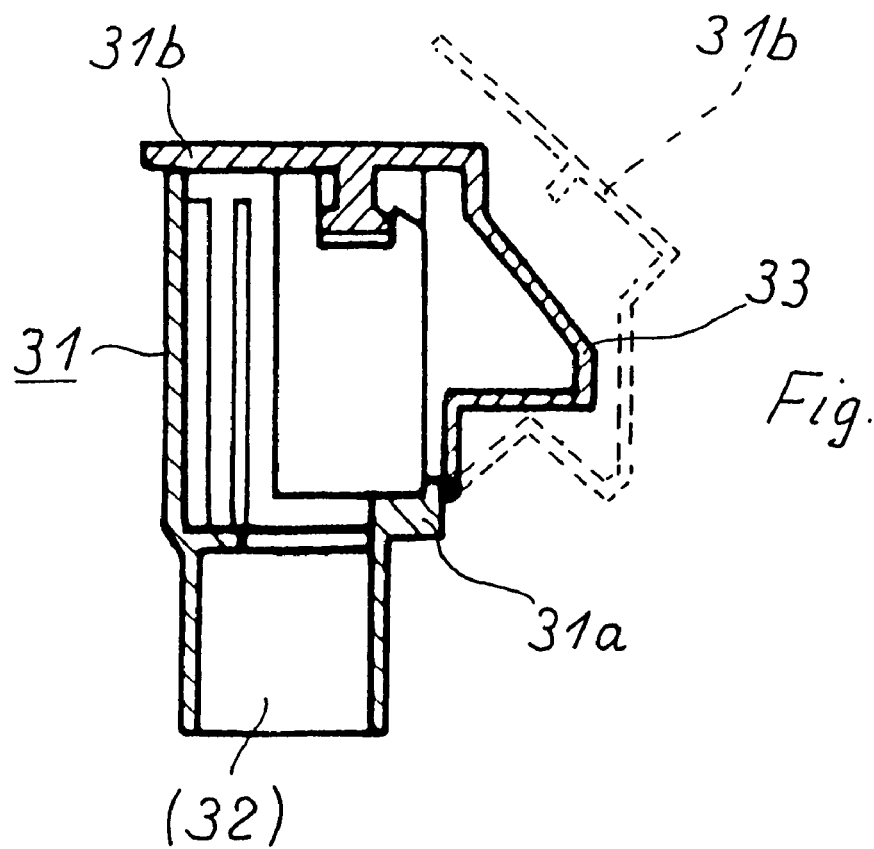
FIG. 11 is a view, in longitudinal section, of the adaptor housing.

As shown in FIGS. 8 and 11, their is provided at the adaptor housing 31 a hold down bracket 33 for the stator assembly 6 which as shown in FIG. 8 holds down and secured the assembled stator pack 6 once the deflector 11 has been mounted. Thus, the stator pack 6 is secured from above against axial displacement by its engagement with the adaptor. As shown in FIG. 11, the adaptor housing 31 consists of a lower housing portion 31a for receiving the circuit board 29 and a lid portion 31b pivotally connected to the lower housing portion 31a. When the adaptor is mounted the lid portion 31b is flush with the flared rim 16 and positively seated in the receptacle 27. The lid portion 31b is connected to the lower housing portion 31a by a flexible joint.

The preferred direction for fully automatically assembling and mounting the suction blower may be maintained even for the adaption of the support cage to electrical components required for the protection of the windings or the motor.

What is claimed is:

1. A vacuum cleaner fan, comprising:
    an electric drive motor including a support cage configured to receive structural modules of the motor, the structural modules including a stator pack, a rotor and brush holders having carbon brushes and connector pins; and
    a blower unit having at least a single stage, the blower unit driven by the motor and including a deflector, an impeller and a suction hood, the deflector configured as a cover for the support cage and including a bearing seat configured to receive the rotor;
    wherein the support cage is configured to receive the structural modules to extend in an axial direction of the blower and wherein the support cage is configured such that the connector pins of the brush holders directly contact stator pack connectors, the brush holders disposed in or on an upper surface of the support cage that faces the deflector.

2. The vacuum cleaner fan recited in claim 1, wherein the support cage includes a rim that extends from the cage and faces the deflector, the rim including receptacles configured to receive the brush holders, the receptacles formed in the rim and open upwardly towards the interior of the support cage.

3. The vacuum cleaner fan recited in claim 1, wherein the support cage includes a rim that extends from the cage and faces the deflector, the rim including receptacles configured to receive the brush holders, and wherein the stator pack connectors protrude from the stator pack, and wherein the rim includes openings that extend into a wall of the support cage, the openings configured to receive the stator pack connectors.

4. The vacuum cleaner fan recited in claim 3, wherein the stator pack connectors are directly contacted by the carbon brushes.

5. The vacuum cleaner fan recited in claim 3, wherein the brush holder connector pins extend in an axial direction of the support cage, the brush holder connector pins configured to contact the stator pack connectors when the carbon brushes are placed into the receptacles.

6. The vacuum cleaner fan recited in claim 3, wherein the rim includes at least one further receptacle configured to receive a plug-in component group that includes electrical components configured to provide for at least one of switching, control and safety functions of the motor.

7. The vacuum cleaner fan recited in claim 6, wherein the electrical components are arranged on a circuit board that is insertable into the at least one further receptacle, the stator pack connectors connected directly with the circuit board during insertion of the circuit board.

8. The vacuum cleaner fan recited in claim 7, wherein the circuit board is configured to be placed in an adaptor housing in the at least one further receptacle.

9. The vacuum cleaner fan recited in claim 6, wherein a bottom side of the at least one further receptacle includes a socket opening penetrating through the wall of the support cage and configured to receive an external plug-in connection.

10. The vacuum cleaner fan recited in claim 8, wherein the adaptor housing includes the brush holder connector pins and the circuit board is placed in the adaptor housing or the circuit board includes the brush holder connector pins.

11. The vacuum cleaner fan recited in claim 10, wherein the adaptor housing includes further connector pins that extend freely into a socket opening in the support cage that is configured for an external plug-in connection.

12. The vacuum cleaner fan recited in claim 8, wherein the adaptor housing is configured to be inserted positively into the receptacle.

13. The vacuum cleaner fan recited in claim 7, wherein the electrical components include a decoupling capacitor and a thermal switch for the motor.

14. The vacuum cleaner fan recited in claim 8, wherein the adaptor housing includes a hold down bracket configured to hold down the stator pack.

15. The vacuum cleaner fan recited in claim 8, wherein the adaptor housing includes a lower housing portion configured to receive the circuit board and a lid portion linked to the lower housing portion.

16. The vacuum cleaner fan recited in claim 15, wherein the lid portion is flexibly linked to the lower housing portion.

17. The vacuum cleaner fan recited in claim 2, wherein the deflector is centrically affixed to the rim.

18. The vacuum cleaner fan recited in claim 2, wherein the rim and the deflector include one or more positively interfitting centering guides that are respectively configured to mutually align the support cage and the deflector, the deflector including the one or more positively centering guides in a marginal portion at the lower side of the deflector.

19. The vacuum cleaner fan recited in claim 18, wherein the centering guides include at least one of pins, profiled protrusions and bores.

20. The vacuum cleaner fan recited in claim 18, wherein the receptacles for the brush holders are configured as centering counter pieces for the centering guides and are positioned at the lower side of the deflector.

21. The vacuum cleaner fan recited in claim 18, wherein the centering guides are configured as hold-down brackets for the brush holders.

22. The vacuum cleaner fan recited in claim 18, wherein the centering guides have a U-shaped configuration and are configured as hold-down brackets.

23. The vacuum cleaner fan recited in claim 1, wherein the stator pack is positively secured in the support cage.

24. The vacuum cleaner fan recited in claim 1, wherein the support cage includes at least one of support braces and receptacles that positively complement a contour of a stator of the stator pack.

25. The vacuum cleaner fan recited in claim 1, wherein the support cage includes a support cage bottom having suction air exits and configured to receive a rotor bearing.

26. The vacuum cleaner fan recited in claim 1, wherein the support cage and the deflector include a nonmetallic material.

27. The vacuum cleaner fan recited in claim 26, wherein the nonmetallic material includes a plastic.

* * * * *